United States Patent

[11] 3,539,203

[72] Inventor Robert T. Baugh
 Brookfield, Wisconsin
[21] Appl. No. 813,580
[22] Filed April 4, 1969
[45] Patented Nov. 10, 1970
[73] Assignee Allis-Chalmers Manufacturing Company
 Milwaukee, Wisconsin

[54] DRAFT HOOK LATCH
 10 Claims, 9 Drawing Figs.
[52] U.S. Cl. .................................... 280/504,
 280/509
[51] Int. Cl. .................................... B60d 1/10
[50] Field of Search .......................... 280/504,
 508, 509, 461.1, 460.1, 415.1; 172/272, 275, 445

[56] References Cited
UNITED STATES PATENTS
| | | | |
|---|---|---|---|
| 2,522,791 | 9/1950 | Ketel | 280/506 |
| 3,427,048 | 2/1969 | Sommer et al. | 280/461(.1) |

*Primary Examiner*—Benjamin Hersh
*Assistant Examiner*—Robert R. Song
*Attorney*—Arthur L. Nelson, Kenneth C. McKivett and Robert B. Benson ABSTRACT: A draft hook with latching means for coupling a draft vehicle to an implement.

Patented Nov. 10, 1970 3,539,203

Inventor
Robert T. Baugh
Attorneys

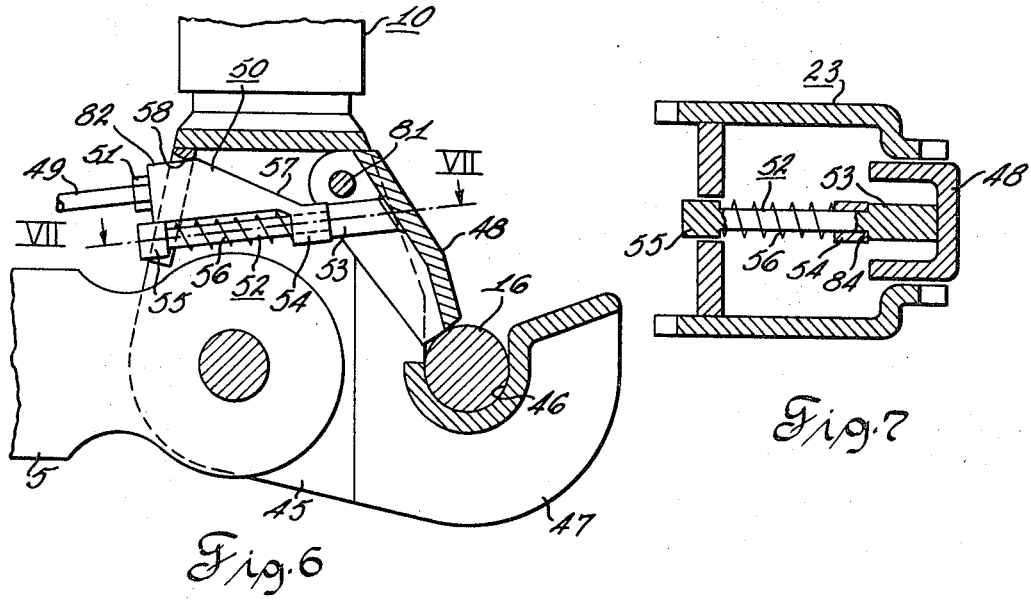
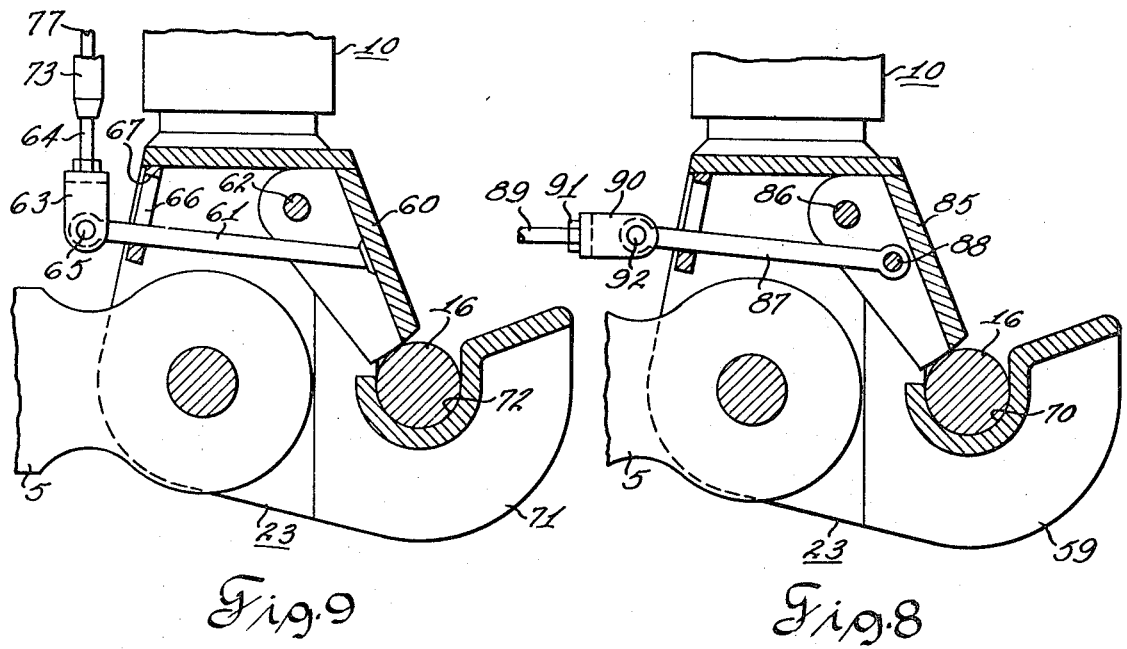

DRAFT HOOK LATCH

This invention relates to a vehicle hitch and more particularly a draft hook and latch for a draft vehicle.

Draft vehicles such as tractors, using the internal combustion engine have over the years increased in size with an increase in the horsepower output of the engine. The tractor has also become more versatile in that the engine supplies power for an increasing number of power-operated systems to provide auxiliary operations associated with the tractor. The conventional drawbar coupling to the implement may be used for some operations although this type of hitch has largely been replaced by the three-point hitch. The larger tractors using the category two and category three-type hitch also have combined the hitch adapter with the three-point hitch which may be controlled from the operator's station. The draft hooks on the hitch adapter are not always in view of the operator and consequently to ensure positive operation certain revisions in the hitching mechanism must be provided. These provisions must assure positive coupling and decoupling of the implement with means for indicating to the operator whether or not the implement is connected.

Accordingly, this invention relates to draft hooks on the draft arms of the tractor which can be remotely operated from the operator's station. A latch is also provided on the hooks which will positively lock the implement studs in the draft hooks when the implement is engaged and conversely when the implement is decoupled the latch will readily release the implement from the hitch.

It is an object of this invention to provide a hook and latch adapted for remote operation for coupling and decoupling an implement to the tractor.

It is another object of this invention to provide draft hooks and latch means wherein any force tending to uncouple the implement will be directed through a latch abutment in preference to the latch pivot support.

It is a further object of this invention to provide a latch trigger which will hold the latch open when the implement is decoupled and which will release the latch simultaneously with the coupling of the implement to the tractor hitch.

It is a further object of this invention to provide a latch lock retaining the implement in the coupled position and a means for readily unlocking the latch to permit decoupling of the implement from the tractor hitch.

The objects of this invention are accomplished by providing a draft hook with a latch member supported to pivotally latch the implement when it is engaged in the hook. An operator control means is also provided to latch and unlatch the implement in the hook and is adapted for operation by remote control. A further refinement of the invention is to provide a lock on the latch which will lock the latch in the engaged position to prevent the implement from becoming decoupled from the tractor. A further improvement is to retain the latch in the unlatched position so long as the implement is not connected to the hook. When the implement stud is received in the hook a trigger automatically releases the latch and permits the latch to latch the vehicle in position until the operator desires to decouple the implement from the vehicle. The latch operates by a reciprocal motion which may be either vertical or horizontal which pivots the latch. The latch may be retained in its latched or unlatched position by the locking arrangement or the trigger arrangement which retains the latch open. The motion required by the operator of a predetermined magnitude in each of two directions will indicate to the operator that the latch is in the latched position or the unlatched position and this in turn will indicate whether or not the vehicle is coupled or decoupled.

The preferred embodiments of this invention are illustrated in the attached drawings.

FIG. 6 illustrates a modification of the hook and latch with the latch in the latched and locked position;

FIG. 7 is a cross-sectional view taken on line VII–VII of FIG. 6;

FIG. 8 illustrates the hook with the latch in the latched position and adapted for reciprocal horizontal motion for latching and unlatching; and FIG. 9 is a cross-sectional view of a modified latch without a lock utilizing a vertical reciprocal motion to latch and unlatch the latch element.

Figure 1:
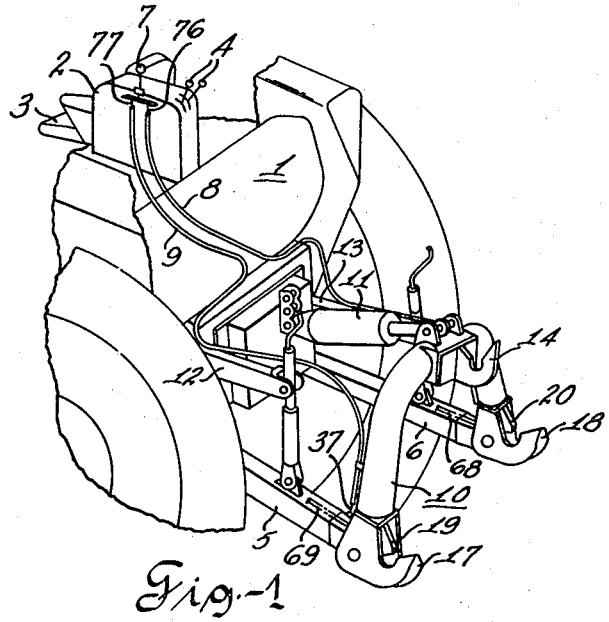
FIG. 1 illustrates a three-dimensional view of the latch and means for remotely operating the latch.

Referring to FIG. 1, the tractor 1 is constructed with a control panel 2 at the operator's station 3. The control panel includes control levers 4 operating hydraulic actuators for auxiliary equipment on the tractor. The panel 2 is also provided with a lever 7 connected to a pair of Morse push-pull cables 8 and 9 including actuator elements 76 and 77 which operate the latches. The latch is positioned on the hitch adapter 10. the hitch adapter 10 is connected to the rear end of the upper link 11 and the rear end of the draft arms 5 and 6. The upper link 11 controls the leveling of the implement when the implement is hooked onto the adapter 10. The rocker arms 12 and 13 automatically control the raising and lowering of the implement such as the plow during normal operations in response to a draft signal sensed by a sensor on the tractor.

The adapter 10 is used to connect the implement to the tractor. A cross pin in the upper end of the mast of the implement will be received in the upper hook 14 while a pair of implement studs 16 will be received in the hooks 17 and 18. The latch 19 and 20 will lock the implement studs in position responsive to actuation of the lever 7. The lever 7 engages and disengages the latches.

Figures 2, 4:
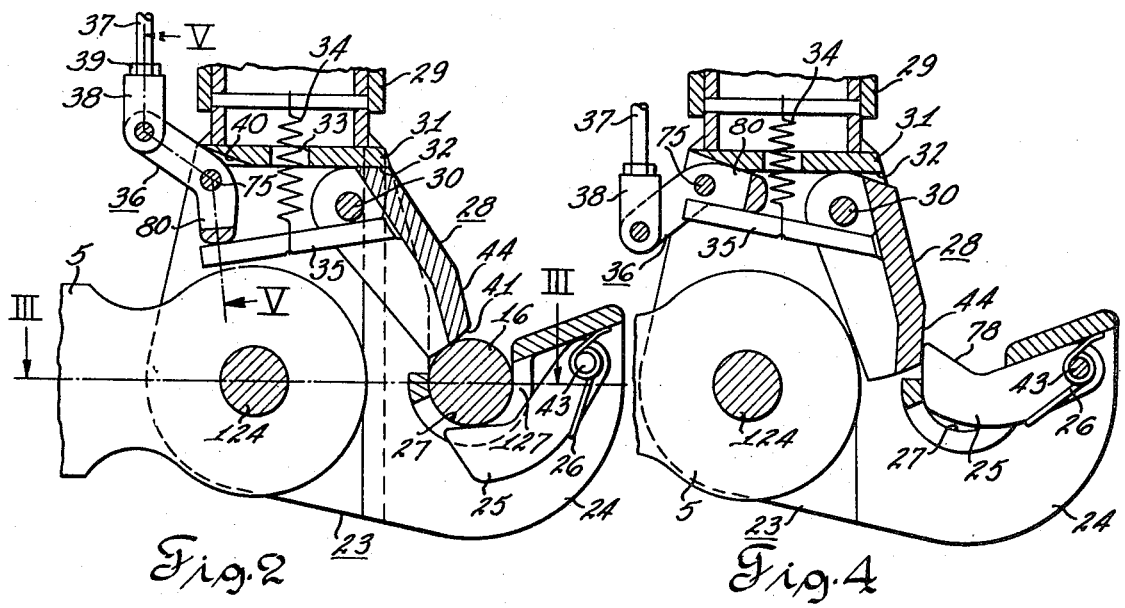
FIG. 2 illustrates the hook with the latch in the latched position and the latch locked.
FIG. 4 illustrates a hook with the latch unlocked and the trigger retaining the latch in the unlocked position.

FIG. 2 illustrates a cross-sectional view of a draft arm 5 or 6 positioned in a draft member 23 and retained in this position by a pin 124. The draft member 23 defines a hook 24 carrying a trigger 25 biased by a spring 26 against the stud 16. The stud 16 is firmly seated in the arcuate seat of the opening 27 of the hook 24. The end wall 127 of opening 27 is normal to the line of draft which passes through the center of opening 124 and arcuate center of opening 27. The implement stud 16 is retained in this position by the latch 28.

The draft member 23 is also fastened to the frame 29 of the hitch adapter 10. The portion of draft member 23 fabricated to the frame 29 provides a support for the latch 28 by means of a pivot pin 30. The latch 28 pivots against a plate 31 defining a latch abutment 32. The plate 31 is formed with a perforation 33 for receiving a spring 34 engaging the stem 35 of the latch 28. The spring 34 biases the latch toward the open position.

The bellcrank 36 is pivoted by the actuator rod 37 connected to the link 38 which is fastened by nut 39. The bellcrank 36 pivots over center and abuts against the abutment 40. Since the bellcrank 36 pivots over center any force on the underside 41 of the latch 28 will increase the pressure of the bellcrank 36 against abutment 40 when the stem 35 is forced upwardly. The force tending to unlatch the latch 28 would ordinarily be created by the implement stud 16 in the opening 27 of the hook 24.

Figure 5:
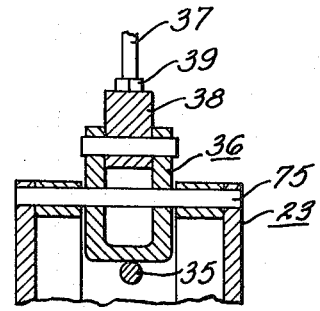
FIG. 5 is a cross-sectional view taken on line V–V of FIG. 2.

FIG. 4 illustrates a latch 28 in its open position. The actuator 37 is moved downwardly to pivot the bellcrank 36 in a manner to permit the stem 35 of the latch 28 to pivot upwardly. The spring 34 biases the latch 28 in its retract or open position. The stem 35 moves upwardly to engage the side of the bellcrank 36. The stem 35 and the bellcrank 36 operate within a slot which limits the lateral movement and the movement of the link as shown in FIG. 5. The actuating force engaging the latch is responsive to movement of the actuator while the spring force unlatches the latch.

The latch pivots on the supporting pin 30. The trigger 25 also pivots on a pin 43 in response to the biasing force of the spring 26. As the latch is retracted as indicated in FIG. 4, the trigger 25 moves upwardly to engage a surface 44 on the vertical facing of the latch 28. This in turn maintains the latch 28 in its unlatched position until an implement 16 again presses the trigger 25 permitting the latch 28 to close. The closing of the latch, however, is in response to the movement of the actuator 37. The movement of the actuator 37 will engage latch 28 as shown in FIG. 2.

Figure 3:
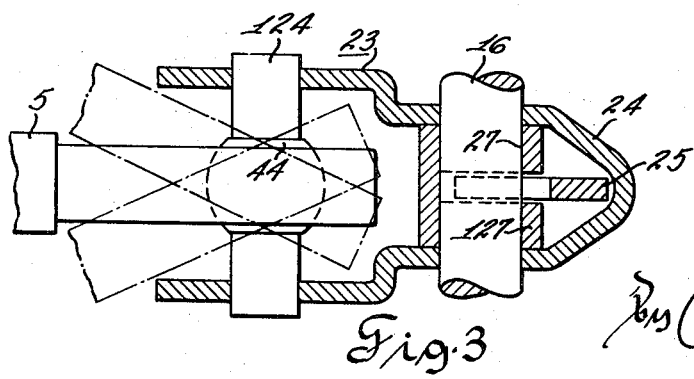
FIG. 3 illustrates a cross-sectional view taken on lines III–III in FIG. 2.

FIG. 3 illustrates a cross-sectional view taken on line III–III of FIG. 2. Essentially, FIG. 3 shows the implement stud 16 seated in the opening 27 depressing the trigger 25. The draft member 23 is shown in cross section with the pin 124 connected to the draft arm 5. A socket is formed in the draft arm 5 by the sleeve 44. The sleeve 44 has a cylindrical bore to receive the pin 124 and a spherical external surface to receive the draft arm 5. This joint provides universal movement of the draft arm 5 relative to the draft member 23 to permit use of the draft member 23 on either category two or three-type hitches. It is understood that the difference in the two categories of hitches requires a different lateral spacing of the rear ends of the draft arms.

FIGS. 6 and 7 illustrate a modification of the draft hook in which the adapter 10 is connected to draft member 45. The implement stud 16 is positioned within the opening 46 of the hook 47. The latch 48 is in the closed position in response to a substantially horizontal movement of the actuator rod 49. Actuator rod 49 is fastened to the wedge element 50 locked by the lock nut 51. The base end of the wedge element 50 rides in the slot of the draft member 45. The latch 48 is fabricated with the stem 52 having an enlarged portion 53 abutting the slidable collar 54 on the end of the wedge element 50. The stem 52 is formed with a head 55. A spring 56 is compressed between the collar 54 and head 55 permitting movement in a left-hand direction relative to the stem 52. This movement will permit the inclined surface 57 to slide in the left-hand direction under the abutment 58 to release the latch. The spring permits sufficient movement so that the inclined surface 57 will allow the latch 48 to be retracted from the opening 46. As the actuator rod 49 is moved in the right-hand direction, the collar 54 engages the enlarged portion 53 on the stem 52 of the latch 48 in the engaged position as shown in FIG. 6.

FIG. 8 is a modification of a hook and latch in which the locking arrangement is eliminated from the draft arm 23. The pendulum-type latch 85 is pivoted on a pin 86 and is actuated by a rod 87 pivotally connected by pin 88 to the latch 85. The actuator rod 89 is threadedly connected to the clevis 90 and held by the lock nut 91. The clevis 90 is connected to the rod by the pin 92. The reciprocal movement in a horizontal direction of the rod 89 will engage and disengage the latch 85 to retain the implement stud 16 in the hook 59. The trigger 25 is not shown on this modification.

FIG. 9 illustrates a pendulum-type latch 60 fabricated to a stem 61 and pivotally supported by pin 62 on the draft arm 23. The latch 60 is shown in the engaged position retaining the implement stud 16 in the hook 71. The stem 61 of pendulum latch 60 extends to pivotally connect to the clevis 63 and the actuator rod 64 by means of a pin 65. A partition 66 with a slot 67 extends downwardly within the draft arm 23 and restricts the pivotal movement of the stem 61 to a pivotal upward or downward movement as limited by the slot. The modification as shown in FIG. 9 provides for a vertical movement of the stem 61 and a vertical positioning of the Morse cables 8 and 9 as shown in FIG. 1. Where a reciprocal movement in a substantially horizontal direction is required, the cables 8 and 9 may be repositioned as illustrated in the phantom view of the cables 68 and 69. The cables would be positioned either on the draft bars 5 and 6 or on the hitch adapter 10 depending on the direction of reciprocal movement required to latch and unlatch.

The operation of the latch will be described in the following paragraphs.

Referring to FIG. 8, the latch as shown is operated by a horizontal reciprocal movement on the actuating rod 89. The reciprocating movement of actuating rod 89 pivots the latch 85 on its supporting pin 88 to move the latch into the opening 70 to retain the implement stud 16 within the opening 70. The actuator rod 89 can also be reciprocally moved in the opposite direction to withdraw the latch 85 to permit the stud 16 to move out of the opening 70 to decouple the implement.

Referring to FIG. 1, the lever 7 can be raised or lowered to cause the Morse cables 8 and 9 to move the actuator 89 in a substantially horizontal direction. This is achieved through cables 68 and 69 when positioned horizontal as indicated on the draft arms 5 and 6. It is understood that the cables 8 and 9 are of the type known as a Morse cable in which the sheath is fastened to the control panel and to the draft arms and any movement of the lever 7 is a relative movement which creates a relative movement between the cables in their sheath which is transmitted to the latch end 77 of the cable. The magnitude of movement of the control end is equal to that of the latch end. This movement operates the latch.

Referring to FIG. 9, a modification is illustrated wherein the draft member 23 defining a hook 71 having an opening 72 receives an implement stud 16. The latch 60 is pivoted into the engaging position as shown or withdrawn from the engaging position by a vertical movement of the control rod 64.

The rod 64 is received within the sheath 73 which is fastened to the adapter 10 and is reciprocally moved within the sheath 73 and produces a relative movement between the actuator 64 and the adapter 10. This movement operates the latch 60. A movement of the lever 7 as previously described creates a movement of equal magnitude and direction as indicated in FIG. 1 to operate a latch 60.

Referring to FIGS. 2 and 4, a modification is illustrated wherein the rod 37 is integral with a cable 8 or 9. The movement of the rod 37 will cause a bellcrank 36 to pivot on pin 75 biasing a stem 35 to move downwardly and pivoting the latch 28 to its closed position. The movement is against the biasing forces spring 34. A reciprocal downward movement of the rod 37 releases the stem 35 and permits the biasing force of spring 34 to move the stem 35 upwardly. This in turn will cause the latch 28 to pivot to a position to release the implement stud 16 and decouple the implement. The trigger 25 is biased by the spring 26 to move upwardly and engage the facing 44 on the latch 28. This will maintain the latch 28 in its retracted position.

When an implement is to be coupled, the implement stud 16 will engage the surface 78 of the trigger 25 and move the trigger downwardly permitting the latch 28 to be latched. The operator moves the lever 7 upwardly to cause the cable 76 and rod 37 to pivot the bellcrank 36 and depressing the stem 35 on the latch 28. The arm 80 of the bellcrank 36 pivots over center and causes a force against the abutment 40 on the plate 31. This force is produced by the spring 34 and any additional force which may be associated with movement of the implement stud 16. The latch 28 is accordingly permanently locked against any movements of the implement which would tend to unlatch and release the implement.

Referring to FIGS. 6 and 7, a modification is illustrated. A horizontal movement of the actuating rod 49 and a cable 76 or 77 will cause the latch 48 to operate. A movement in the right-hand direction will pivot the latch 48 about its pivot pin 81 causing the latch 48 to move into the engaging position as shown. The wedge element 50 carries a collar 54 which abuts against the large diameter portion 53 of the stem 52 when the reciprocal movement in the right-hand direction forces the latch 48 to a position as shown and causes the inclined surface 57 to move beyond the abutment 58 and causes the flat surface 82 to engage the abutment 58. In this position, the latch 48 is locked and any vertical movement of the implement stud cannot uncouple the implement.

When the latch 48 is disengaged, the actuating rod 49 which is integral with the cable 76 or 77 will cause the wedge element 50 to move the collar 54 against the biasing force of the spring 56 and unseat the flat surface 82 from the abutment 58. Further left-hand movement of the wedge element 50 will cause the collar 54 to further compress the spring 56 against the end 55 of the stem 52. This force will cause a latch 48 to pivot about its pin 81 and move to the unlatched position out of the opening 46. When the latch 48 moves out of the opening 46, the implement stud 16 can be removed from the hook 47.

The latch as shown provides the trigger for retaining the latch in the unlatched position until an implement is coupled to the hitch. The latch further provides either a reciprocal or horizontal movement which is initiated at the operator's station on the tractor to engage or disengage the latch. The latch further provides a visual indication of its position at the operator's station on the tractor. A lock is also provided on the latch to positively lock the latch in its engaged position which will prevent coupling of the implement when it is in operation and will also indicate to the operator when the implement is coupled.

I claim:

1. A draft hook and latch for use on a draft vehicle comprising, a draft member adapted for connection to a draft arm and defining a hook having an opening adapted for receiving an implement stud, a pivotally supported latch of unitary structure on said draft member, a latch abutment on said draft member, said latch pivotally resting against said latch abutment for absorbing force transmitted through said latch when said latch is in the latched position, said latch abutment serving also as a stop means preventing continued pivotal movement of said latch beyond said latched position, a latch control pivotally connected with said latch for controlling the pivotal movement of said latch to and from the latched and unlatched position.

2. A draft hook and latch for use on a draft vehicle as set forth in claim 1 wherein said latch control includes a horizontal reciprocating member pivotally connected to said latch to pivot said latch to a latched and unlatched position.

3. A draft hook and latch for use on a draft vehicle as set forth in claim 1 wherein said latch includes a latch stem extending from said latch and said latch control is pivotally connected to said stem and moves in a reciprocal vertical movement to move said latch to the latched and unlatched positions.

4. A draft hook and latch for use on a draft vehicle as set forth in claim 1 wherein said latch includes a spring-biased stem normally biased to an unlatched position, a bellcrank connected between said latch control and said stem to selectively pivot said bellcrank and move said latch to a latched position and counterpivot said bellcrank to cause the biasing force on said stem to unlatch said latch.

5. The draft hook and latch as set forth in claim 1 wherein said latch includes a stem normally spring-biased to an unlatched position, a rest stop on said draft member, a bellcrank pivotally mounted on said draft member and pivotally connected between said control and said latch, said bellcrank engaging said rest stop in an overcenter position to prevent said latch from unlatching when said latch is in the latched position.

6. A draft hook and latch for use on a draft vehicle as set forth in claim 1 including a reciprocal spring-biased wedge member defining an axis of movement and positioned for connection with said latch, a stop defined by said draft member, said wedge member defining an inclined surface and a substantially parallel surface relative to said axis to latch and lock said latch in the latched position and to withdraw said latch to an unlocked position and pivot the said latch from the opening and said hook.

7. A draft hook and latch for use on a draft vehicle as set forth in claim 1 including a trigger pivotally positioned on the extending end of said hook, a spring biasing said trigger to engage said latch to maintain said latch in unlatched position, said trigger adapted for engaging a stud of an implement to depress said trigger to release said latch and allow said latch to move into a latched position.

8. A draft hook and latch for use on a draft vehicle as set forth in claim 1 wherein said draft member defines a circular opening having an axial center for receiving a pin adapted for connection to the draft arm, said hook defines an opening for receiving an implement stud, said opening defining an arcuate seat having a center and an end wall normal to the line of draft connecting said centers to thereby eliminate stress couples in said draft member.

9. A draft hook and latch for use on a draft vehicle as set forth in claim 1 wherein said latch is a pendulum-type latch suspended on its upper end and defining a transverse surface, said latch pivots to a latched position to engage the latch abutment along said transverse surface whereby any vertical force tending to decouple the implement stud is largely received on the abutment to relieve stress on the pivot pin of the latch.

10. A draft hook and latch for use in a draft vehicle as set forth in claim 1 wherein said draft member is connected to a draft arm by a pin having an axis, said draft arm defining a line of draft passing through said axis, said hook defining an opening for receiving an implement stud having a center lying on said line of draft to thereby eliminate stress couples in said draft member.